United States Patent
Alamanos

(10) Patent No.: US 9,758,120 B2
(45) Date of Patent: Sep. 12, 2017

(54) AUTOMATIC CLOUDBASED NOTIFICATION SYSTEM FOR VEHICLE ACCIDENTS

(71) Applicant: Andreas Alamanos, Athens (GR)

(72) Inventor: Andreas Alamanos, Athens (GR)

( * ) Notice: Subject to any disclaimer, the term of this patent is extended or adjusted under 35 U.S.C. 154(b) by 0 days.

(21) Appl. No.: 14/804,816

(22) Filed: Jul. 21, 2015

(65) Prior Publication Data
US 2016/0031397 A1  Feb. 4, 2016

Related U.S. Application Data

(60) Provisional application No. 62/028,570, filed on Jul. 24, 2014.

(51) Int. Cl.
| | | |
|---|---|---|
| *B60Q 1/00* | (2006.01) | |
| *B60R 21/00* | (2006.01) | |
| *G08B 25/01* | (2006.01) | |
| *G08G 1/00* | (2006.01) | |
| *H04W 4/22* | (2009.01) | |
| *H04W 4/04* | (2009.01) | |
| *G08G 1/01* | (2006.01) | |
| *G08B 25/00* | (2006.01) | |
| *G08B 25/08* | (2006.01) | |

(52) U.S. Cl.
CPC .......... *B60R 21/00* (2013.01); *G08B 25/001* (2013.01); *G08B 25/002* (2013.01); *G08B 25/016* (2013.01); *G08B 25/08* (2013.01); *G08G 1/012* (2013.01); *G08G 1/205* (2013.01); *H04W 4/046* (2013.01); *H04W 4/22* (2013.01); *B60R 2021/0027* (2013.01)

(58) Field of Classification Search
CPC ............ B60R 2021/0027; B60R 21/00; G08B 25/001; G08B 25/005; G08B 25/016; G08G 1/205; H04W 4/22
USPC .......... 340/425.5, 531, 539.1, 426.1, 426.18, 340/539.11, 6.1, 8.1, 573.4, 686.1, 340/902–903, 691.1
See application file for complete search history.

(56) References Cited

U.S. PATENT DOCUMENTS

| | | | | |
|---|---|---|---|---|
| 5,515,043 | A * | 5/1996 | Berard .................. | B60R 25/102 340/426.19 |
| 5,959,552 | A * | 9/1999 | Cho ....................... | B60R 19/205 180/167 |
| 6,370,475 | B1* | 4/2002 | Breed .................. | B60N 2/2863 340/436 |
| 8,929,853 | B2* | 1/2015 | Butler ................ | H04M 1/72538 379/39 |
| 2005/0200479 | A1* | 9/2005 | James .................... | G08G 1/205 340/539.18 |
| 2014/0380264 | A1* | 12/2014 | Misra ........................ | G06F 8/00 717/100 |
| 2015/0029020 | A1* | 1/2015 | Bailey .................. | G08B 25/005 340/502 |

* cited by examiner

*Primary Examiner* — Daniel Previl
(74) *Attorney, Agent, or Firm* — Brown & Michaels, PC

(57) ABSTRACT

The proposed method and system is a client-server system where client is an application monitoring and processing the readings of the sensors of a personal mobile device in a moving vehicle and when the possibility of a crush is predicted, transmit to the remote server a provisional alarm. If after a predefined time period a FALSE ALARM signal not received by the remote server from the client then an accident alarm ticket will be forwarded from the remote server to an emergency service center.

9 Claims, 3 Drawing Sheets

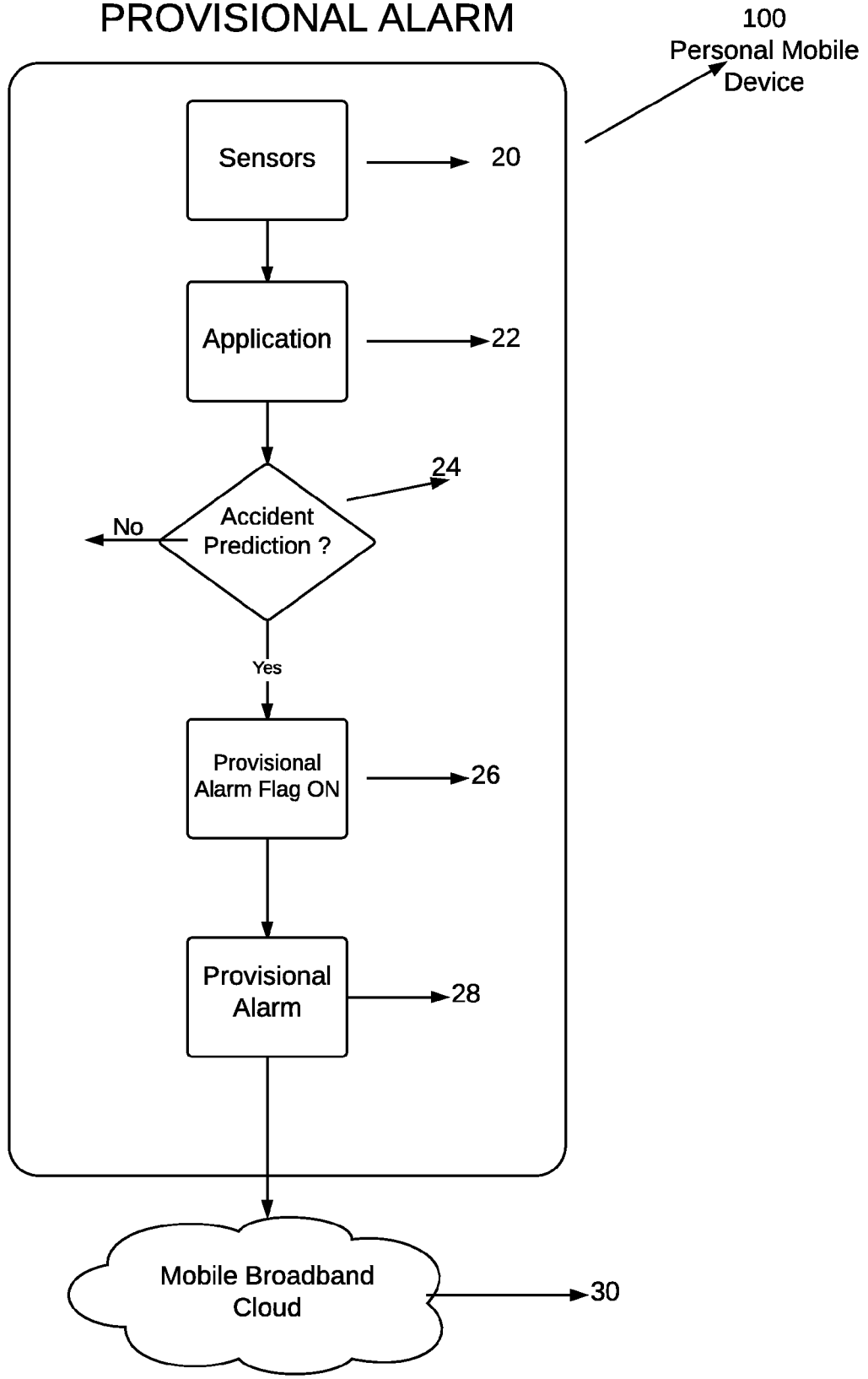

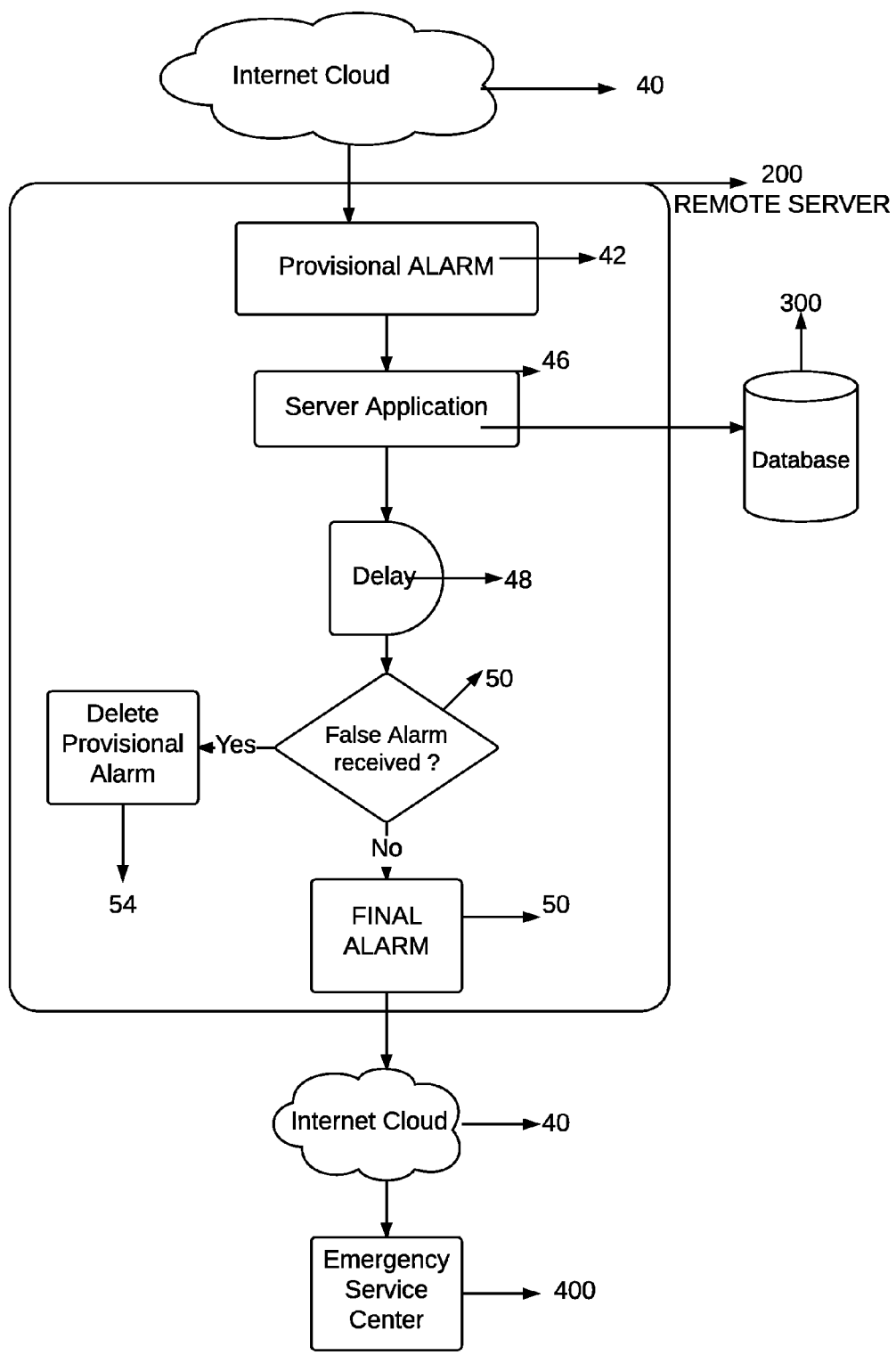

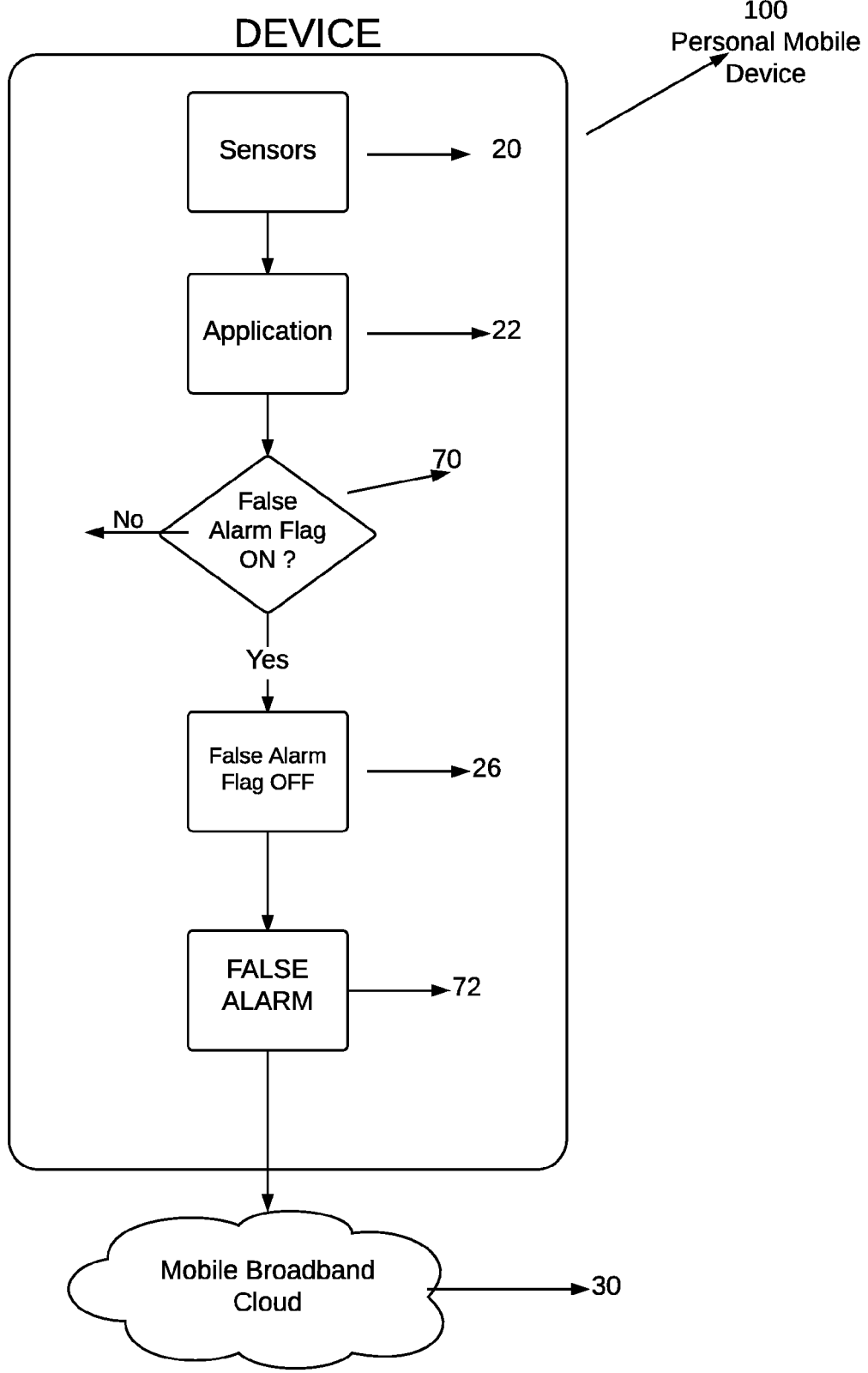

AUTOMATIC CLOUDBASED NOTIFICATION SYSTEM FOR VEHICLE ACCIDENTS

CROSS-REFERENCE TO RELATED APPLICATION

This application claims the benefit of U.S. Provisional Patent Application No. 62/028,570, filed Jul. 24, 2014.

BACKGROUND

Field of the Invention

The invention relates to emergency notifications for vehicles accidents and with more particularity to forward automatically vehicles accident notifications to rescue centers.

Description of Related Art

The number of traffic accidents victims is a huge social problem around the world, only in the European Union, about 30,000 people a year lose their lives while about four permanent disabilities associated with each death.

The timely arrival of assistance to the place of an accident can save lives but an emergency call has be made to a rescue center immediately.

Modern vehicles incorporate more and more digital technology solutions that mainly alter the man-machine (driver-vehicle) interface, current vehicles have on-board sensors providing data for processing to central or peripheral processing units.

Some vehicles manufacturers have already accident detection systems in their optional equipment list.

Advantages are using on-board sensors with known characteristics (variants, max. range, noise distribution etc.) and aware on the commands to the vehicle (steering, increase of throttle, braking etc.)

The weak points is the high cost, and if the detector destroyed in the accident no emergency message will be sent. Also the high maintenance cost, in case of a major change in the system all vehicles have to be recalled for modifications.

SUMMARY

The proposed system is a cloud based client-server system using, on client side, the sensors of a personal mobile device in a moving vehicle and by monitoring the sensors of the personal mobile device and processing their readings through a signal processing algorithm can provide prediction on the possibility of an accident. When this happens a provisional alarm is transmitted to a remote server. The provisional alarm will be canceled by the mobile application, after a predefined time (the remote server's delay minus 30%), if the personal mobile application is still active, by transmitting a "FALSE ALARM" signal. At remote server side, if within the predetermined delay a cancellation of provisional alarm not received from the specific personal mobile device, an accident ticket will be issued to an emergency services center.

In this way even if a strong accident destroys the personal mobile device, the signal need not be sent from the personal mobile device but from the remote server AFTER the accident, so will be no false (phantom) emergencies.

Today's personal mobile devices have good sensors with high frequency sampling and powerful processing units to ensure the effectiveness of the system.

BRIEF DESCRIPTION OF THE DRAWINGS

FIG. 1 is a flowchart showing steps in personal mobile device to transmit provisional alarm FIG. 2 is a flowchart showing steps of processing a provisional alarm in remote server.

FIG. 3 is a flowchart showing steps in mobile device to transmit false alarm signal

DETAILED DESCRIPTION

Issues to solve:

Cost effective portable accident detection and emergency messaging system which does not use the on board sensors and does need to be installed in the vehicle.

Detect incoming accident in very short time and transmit the provisional distress signal before the possible destruction.

No "phantom" emergency messages, client application in personal mobile device can recall provisional alarms.

System's Description

The proposed method and system is a client-server system where client is an application 22 monitoring and processing the readings of the sensors 20 of a personal mobile device 100 in a moving vehicle and when the possibility of a crush is predicted, transmit to the remote server 200 a provisional alarm 28. If after a predefined delay 48 a FALSE ALARM 42 signal not received by the remote server from the client application 22 then an accident alarm 52 will be forwarded from the remote server 200 to an emergency service center 400 through Internet Cloud 40 or by a phone call from remote server 200 operator.

Client is an application 22 installed in a personal mobile device 100 which located in a vehicle,. The client application 22 when detects that vehicle is on move, will collect readings from various sensors 20 and using a software algorithm with signal processing or any other processing method to predict next state of the vehicle. In case of signal processing a Kalman filter could be used.

When difference between current and predicted state exceeds a defined threshold then a provisional alarm 28 is transmitted, through Mobile Broadband Cloud 30, which will be canceled, by a "false alarm" 42 after a predefined time which will be the remote server's delay 48 minus 30%, In this way even if a strong accident destroys the personal mobile device 100, the signal need not be sent from the personal mobile device 100 but from the remote server 200 AFTER the accident, so will be no false (phantom) emergencies.

This approach is not new, signal processing and specifically the Kalman filter used for years to control, tracking and predicting the path of many kinds of vehicles from unmanned vehicles and robots to missiles and spacecrafts.

Alternatively a different algorithm (with no signal processing) could be used to compare difference between the previous and last kinetic state of the personal mobile device 100 and if exceeds a defined threshold to trigger a provisional alarm 28.

By above methods a non dedicated personal mobile device 100 can initiate the issue of a trusted distress signal 52.

Operation

The mobile application 22 will detect through the sensors 20 when the personal mobile device 100 is in a moving vehicle and it will be activated. In this way will be no unnecessary provisional alarms 28 and buttery usage for GNSS readings and processing when device is not in a moving vehicle.

Installation—User's Registration

Upon the installation of client application 22 in the personal mobile device 100 the following data will be required from the user:
First. Last name of user
Vehicle's registration number (optional when user is the driver of the vehicle)
Vehicle's manufacturer, model and manufacturing year (optional when user drives the vehicle)
The application 22 will also, with the permission of the user, will fetch automatically the following data from the personal mobile device 100:
IMSI (subscriber ID)
SIM's serial number
IMEI (which is unique and will used as ID of the personal mobile device)
Phone number and registration country's ISO code (if apply)
Personal mobile device manufacturer, model and OS version
Current location coordinates.
Data will be stored in a local database table 300 of remote server 200 system.

Provisional Alarm Timeline

The minimum time from the onset of a vehicle accident until the destruction of the vehicle's main parts estimated to 150 ms.

The location updates from GNSS listeners have frequency of up to 5 Hz but usually 1 Hz (1 sec). As soon as location data became available will be stored in memory variables of personal mobile device application 22 to be dispatched immediately when required.

The sampling rate of the critical sensors 20 (accelerometer—gyroscope-compass) in most personal mobile devices 100 can be set by changing the sector delay vector. In any case the minimum sampling frequency can be 50 Hz (20 ms).

Filter's computation time<5 ms (depends on the clock of CPU).

Time for alarm to leave the phone's antenna<8 ms (laboratory measured).

From above figures a provisional alarm 28 signal will be transmitted in max (20+5+8) 33 ms and therefore at least 4 cycles of readings of sensors 20 can be processed before a provisional alarm 28 is sent.

The actual length of provisional alarm 28 is less than 40 bytes containing only the personal mobile device 100 manufacturer's ID and location coordinates, all remaining user's and personal mobile device 100 data to send to rescue center (vehicle's registration number, IMSI, vehicle's make, model etc.) are already stored in the remote server's 200 database 300.

Signal Processing

The application will use readings from sensors 20 when they become available to feed the motion model of each of the three axles (x,z,y)

The provisional alarm 28 will triggered if the value of innovation (difference between previous prediction and current vehicle's state) exceeds a threshold.

The reliability and accuracy of the signal processing or filter predicts contribute mainly on reducing the number of the provisional alarms 28 and false alarms 42. In fact even by using a simple noise filter and an algorithm to compare the fused readings of the sensors 20 to previous value, against a predefined threshold, the system will work .

The provisional alarms 28 can be reduced by self-learning eg by lowering by a very small percentage the threshold after a false alarm 42. In this way the number of provisional alarms 28 and false alarms 42 continually reduced as the system is trained on user's driving style, the vehicle's characteristics and the sensitivity and properties of the sensors 20.

The client application 22 does not transmit provisional alarm 28 before a new false alarm 42 issued. If time (remote server;s delay 48-30%), between the provisional alarm 28 and the false alarm 42, increased (eg to 30 secs) and accordingly the delay 48 of the remote server 200, communications of personal mobile device 100 to remote server 200 will be significantly reduced at the expense of course of very early warning and accuracy of supplied location data.

The invention claimed is:
1. A method of sending an alarm on the occurrence of a vehicle accident, comprising the steps of:
 a) a personal mobile device in a vehicle monitoring readings from sensors of the personal mobile device;
 b) the personal mobile device processing the readings from the sensors to detect a condition which indicates a possibility that the vehicle is about to have an accident;
 c) when the condition which indicates a possibility that the vehicle is about to have an accident is detected, the personal mobile device transmitting a provisional alarm to a remote server;
 d) the remote server receiving the provisional alarm from the personal mobile device;
 e) the remote server starting a timer upon receipt of the provisional alarm from the personal mobile device;
 f) if the remote server does not receive a cancellation of the provisional alarm from the personal mobile device before the timer reaches an end of a predefined time, the remote server forwarding an alarm to an emergency service center.

2. The method of claim 1, further comprising the step of the personal mobile device sending a cancellation to the remote server if an accident did not occur before the end of a time which is less than the predetermined time from the time the mobile device sent the provisional alarm.

3. The method of claim 2, in which when the personal mobile device sends a cancellation of a provisional alarm, the personal mobile device adjusts a threshold to be used in the step of detecting a condition that indicates a possibility that the vehicle is about to have an accident, such that an occurrence of the same condition will not trigger another provisional alarm.

4. The method of claim 1, in which the personal mobile device detects a condition which indicates a possibility of an accident by the steps of:
 processing the readings from the sensors to generate a predicted next state of the vehicle after a time delay;
 waiting the time delay;
 comparing the predicted next state to an actual state;
 if a difference between the actual state and the predicted next state exceeds a defined threshold, the personal mobile device considers a condition which indicates a possibility of an accident to have been detected.

5. The method of claim 4, further comprising the step of the personal mobile device adjusting the defined threshold after the personal mobile device sends a cancellation of a provisional alarm, such that an occurrence of the same condition will not trigger another provisional alarm.

6. The method of claim 1, in which a length of the provisional alarm is less than 40 bytes.

7. The method of claim 1, in which the provisional alarm comprises an identification of the personal mobile device and coordinates of a location of the personal mobile device.

8. The method of claim 1, in which a length of the provisional alarm is selected such that the provisional alarm is sent by the personal mobile device in less than 33 milliseconds.

9. The method of claim 1, wherein the personal mobile device transmits the provisional alarm to the remote server through a mobile broadband network.

* * * * *